(12) United States Patent
Graefen

(10) Patent No.: US 8,180,382 B1
(45) Date of Patent: May 15, 2012

(54) DIRECT AND IMMEDIATE TRANSMITTAL OF VOICE MESSAGES AND HANDSET STORAGE THEREOF

(75) Inventor: Eddy Arnold Graefen, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1389 days.

(21) Appl. No.: 11/457,650

(22) Filed: Jul. 14, 2006

(51) Int. Cl.
*H04M 4/00* (2006.01)

(52) U.S. Cl. ............... 455/466; 455/412.1; 455/413; 455/414.1; 455/422.1; 455/433; 379/88.13; 379/93.09

(58) Field of Classification Search ............ 455/412.1, 455/413, 466
See application file for complete search history.

(56) References Cited

U.S. PATENT DOCUMENTS

| | | | | |
|---|---|---|---|---|
| 7,123,695 | B2 * | 10/2006 | Malik | 379/88.13 |
| 7,197,122 | B2 * | 3/2007 | Vuori | 379/88.25 |
| 2003/0003897 | A1 | 1/2003 | Hyon | |
| 2004/0014456 | A1 | 1/2004 | Vnnen | |
| 2004/0202291 | A1 | 10/2004 | Skinner | |
| 2004/0203618 | A1 | 10/2004 | Lau et al. | |
| 2005/0136896 | A1 | 6/2005 | Ward et al. | |
| 2005/0250476 | A1 | 11/2005 | Worger et al. | |
| 2005/0266884 | A1 | 12/2005 | Marriott et al. | |
| 2005/0287993 | A1 | 12/2005 | Gogic | |
| 2007/0022213 | A1 * | 1/2007 | Fahmy et al. | 709/246 |

FOREIGN PATENT DOCUMENTS

EP 1185068 3/2002

* cited by examiner

*Primary Examiner* — Justin Lee
(74) *Attorney, Agent, or Firm* — Parks IP Law LLC; Jennifer P. Medlin, Esq.

(57) ABSTRACT

A system and method for direct and immediate transmittal of voice messages is provided. A sender mobile device (MD) is capable of sending instant voice messages to at least one recipient MD over a wireless communications network. The recipient MD(s) are can store the instant voice message in a computer readable memory. The sender MD can query a database and/or the recipient MD(s) to determine if the recipient MD is compatible and/or subscribed to instant voice messaging service. If the recipient MD is compatible and/or subscribed, the voice message is sent directly to the recipient MD, stored, and an instant voice message waiting indicator is presented to the recipient. If the recipient MD is not compatible and/or subscribed, the voice message is sent directly to a voicemail server, stored, and a voice message waiting indicator is presented to the recipient.

6 Claims, 10 Drawing Sheets

DIRECT AND IMMEDIATE TRANSMITTAL OF VOICE MESSAGES AND HANDSET STORAGE THEREOF

TECHNICAL FIELD

The present invention relates to communication systems and more particularly to a system and method for voice messaging.

BACKGROUND OF THE INVENTION

Wireless communication networks provide users with a variety of communication services including voice chat, push-to-talk (PTT), instant messaging, multimedia messaging, short messaging, and voice messaging. Many of these communication services are gravitating towards providing a quick, efficient means to effectively communicate between wireless devices.

For this reason, PTT has become a widely used and popular communication service. PTT utilizes a half-duplex communication scheme. In half-duplex communication, data transmission can only occur in one direction at a time. In contrast, mobile phones, which are essentially complex full duplex (two-way) radios, can transmit data in two directions simultaneously. PTT allows a mobile phone to function in a half-duplex configuration. This is accomplished by using a button to switch from voice transmission mode to voice reception mode. The PTT button is pressed to initiate voice transmission mode. The user can then talk to several others instantly. PTT connects mobile phone users with each other within seconds and eliminates the need to dial a phone number, wait for the telephone to ring, and for the recipient to answer. PTT, however, has its problems. Namely, the voice messages sent via PTT are automatically played over the speaker of the recipient mobile phone. In public environments, the PTT method can be annoying to individuals proximate to the receiving user, as well as in circumstances when the recipient does not want voice messages sent to them without warning.

Short message service (SMS) messaging is another widely used and popular communication service. SMS allows transmission of short (no longer than 160 alpha-numeric characters) text messages to and from mobile phones, fax machines, and/or Internet Protocol addresses. SMS messages are strictly limited to text and cannot contain any images or graphics. After an SMS message is sent, it is delivered to a short message service center (SMSC). The SMSC temporarily stores the SMS message and waits until a channel is available to send the SMS message to the recipient device. For example, in a cellular network, an SMS message is sent from a MD to the SMSC. The SMSC receives the message and sends a SMS Request to the home location register (HLR) of the recipient MD. The HLR determines the status of the recipient MD (i.e., if the recipient MD is active, inactive, roaming, etc.). If the recipient MD is inactive, then the SMSC holds the SMS message until the recipient MD becomes active. When the recipient MD becomes active, the HLR sends a SMS notification to the SMSC and the SMSC attempts to deliver the message. The SMSC transfers the message in a Short Message Delivery Point to Point (SM-DPP) format to the serving system. The system pages the recipient MD, and if it responds, the message gets delivered. The SMSC receives verification that the message was received by the end user, then categorizes the message as "sent" and will not attempt to send again. SMS messaging allows users to send messages, without interrupting a user with a phone call or PTT session. However, SMS is limited by the number of alpha-numeric characters and is cumbersome to insert characters on many of today's MDs.

Voice messaging is yet another commonly used communication service. Voice messages are stored in a voicemail server and are accessible via a telephone number. A user dials the telephone number and is presented with a menu of options regarding their voicemail box. The menu of options typically includes listen to new messages, listen to saved messages, create greeting, etc. If the user selects either listen option, the voice messages are played to the user. Typically, voice messaging does not allow the user to pause, rewind, fast forward, or otherwise manipulate the voice message. Instead, the user must wait until the voice message is complete and choose to replay, save, or delete the voice message. If the user chooses to save the message, the message may only be saved for a short period of time (typically one to two weeks). This may be unsatisfactory to the user.

The communication services described above allow users to stay in contact with each other via methods alternative to traditional phone calls. However, PTT is often times intrusive and SMS messaging is cumbersome to use. In addition, retrieving or sending a voicemail requires a user to access the voicemail server. Voice messages are cumbersome for the retriever, as well as the sender. The sender has to dial the recipient, wait during one or more unanswered rings, listen to the outgoing message, and finally record a voice message. Therefore, a heretofore unaddressed need exists to provide a system and method for direct and immediate transmittal of voice messages and handset storage thereof.

SUMMARY

The present invention provides exemplary systems and methods for providing direct and immediate transmittal of voice messages via a wireless communications network. According to one embodiment, a system according to the present invention comprises a sender mobile device (MD) configured to receive an input, wherein the input is used to identify at least one recipient, record a voice message, query a database and/or at least one recipient mobile device, receive a query response from the database and/or at least one recipient mobile device, and transmit the voice message via a wireless communication network to at least on recipient mobile device and/or a storage server. The recipient mobile device(s) and/or the storage server can be configured to receive the voice message and at least temporarily store the voice message in device readable memory. The recipient mobile device(s) and/or the storage server can be configured to store subscriber account information, the subscriber account information comprising mobile device service compatibility and subscribed services information.

The sender MD can be further configured to store a contact list and the input is a selection of at least one contact from the contact list. The input may be, for example, a telephone number.

The sender MD can be further configured to generate a notification in response to a key press to initiate a recording state, the notification comprising at least one of an icon, a message, and an audible tone.

The sender MD can be further configured to store, at least temporarily, the voice message in a device readable memory.

A method for providing direct and immediate transmittal of voice message via a wireless communications network is also disclosed. The method can include the steps of identifying at least one recipient, recording a voice message, querying a database and/or at least one recipient mobile device, receiving a query response from the database and/or at least one recipient mobile device, transmitting the voice message via a wireless communications network to at least one recipient mobile device and/or a storage server, receiving the voice message by at least one recipient mobile device and/or the storage server, and storing the voice message in a device readable memory of at least one recipient mobile device and/or the storage server. At least one recipient and/or the database can be configured to store subscriber account information, the subscriber account information can include mobile device service compatibility and subscribed services information. The step of identifying at least one recipient can include manually entering a telephone number and/or selecting at least one recipient from a contact list. The step of recording the voice message can include receiving a first key press to initiate a recording state, receiving the voice message via a microphone, storing the voice message at least temporarily in a device readable memory, and receiving a second key press to end the recording state. The method can further include the step of generating a notification after at least one of the first and second key presses, the notification comprising at least one of an icon, a message, and an audible tone.

Alternatively, the step of recording a voice message can include presenting a menu of recording options which can include a start recording option and a stop recording option, receiving a selection of the start recording option to initiate a recording state, receiving the voice message via a microphone, storing the voice message at least temporarily in a device readable memory, and receiving a selection of the stop recording option to end the recording state. The method can further comprise a step of presenting a menu of post-recording options which can include a send option, a listen option, and a re-record option. In addition or alternatively, the menu of recording options and the menu of post-recording options can be combined.

The step of querying can generate a query to determine if the recipient mobile device is authorized to use instant voice messaging services.

The method can further include the step of presenting at least one recipient mobile device with an instant voice message waiting indicator if the step of transmitting sends the voice message to at least one recipient mobile device. The method can further include the step of presenting at least one recipient mobile device with a voice message waiting indicator if the step of transmitting sends the voice message to the storage server.

The present invention also includes a mobile device, the mobile device includes a housing that comprises means for identifying at least one recipient, means for recording a voice message, means for querying at least one of a database and at least one recipient mobile device, means for receiving a query response from at least one of said database and said at least one recipient mobile device, and means for transmitting said voice message via a wireless communications network to at least one of said at least one recipient mobile device and a storage server. Means for identifying includes, but is not limited to, selecting at least one recipient from a contact list and entering a telephone number of at least one recipient. Means for querying includes, but is not limited to, sending a packet via a transceiver to at least one of a database and at least one recipient mobile device to determine if, for example, the at least one recipient mobile device is compatible and/or is subscribed to instant voice messaging service. Means for receiving includes, but is not limited to, receiving a packet via a transceiver in response to a query. The query response can include subscriber and/or mobile device information. Means for transmitting includes, but is not limited to, transmitting voice message packets via a transceiver to at least one recipient mobile device and/or a storage server. The mobile device also includes means for temporarily storing the voice message. Means for temporarily storing includes, but is not limited to, an internal device readable memory, an external device readable memory, and a removable memory, wherein the memory is Random Access Memory (RAM), Read-Only Memory (ROM), and/or a hybrid of RAM and ROM.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
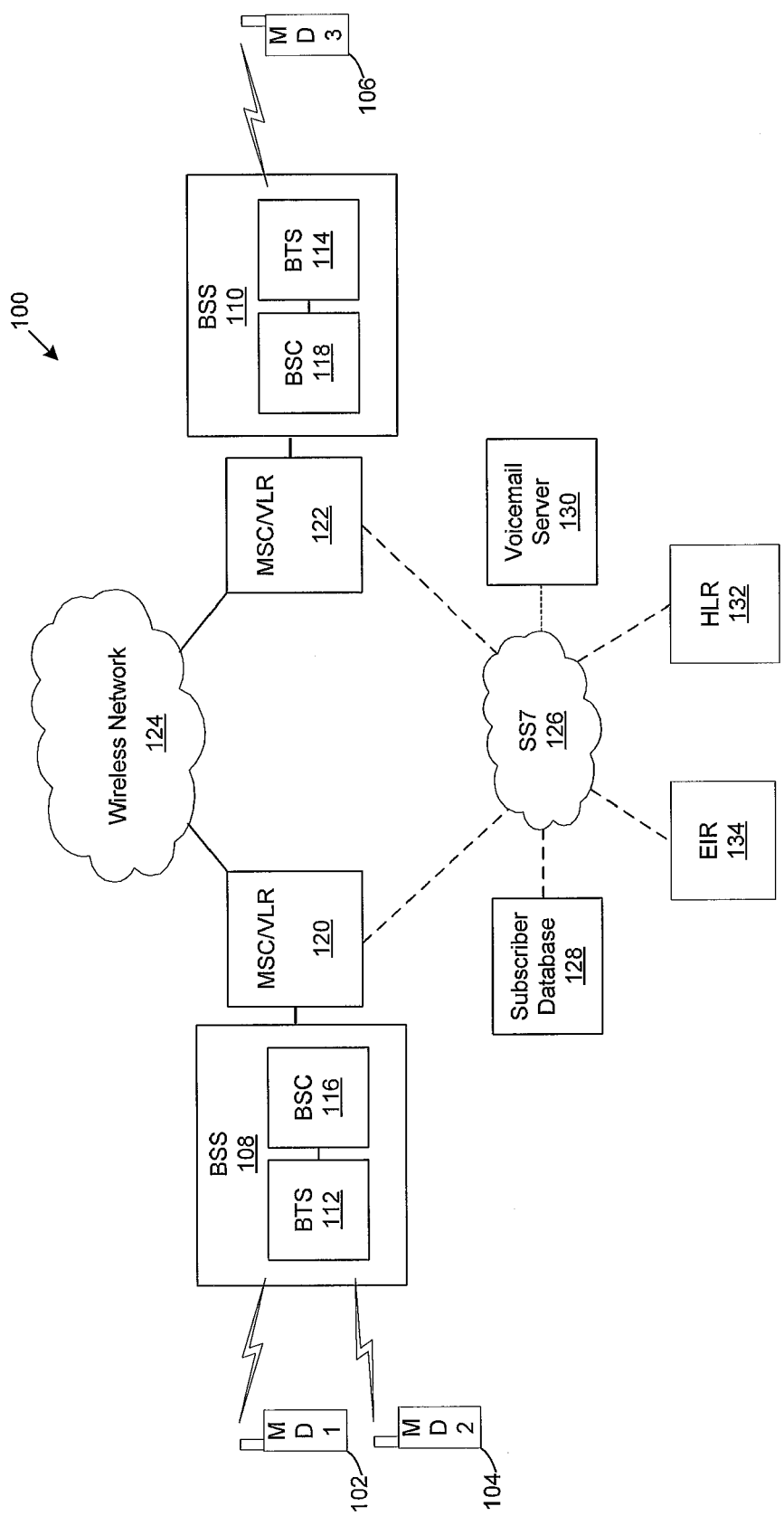
FIG. 1 is a block diagram illustrating a wireless communication system for direct and immediate transmittal of voice messages over a wireless network, according to the present invention.

Referring now to the drawings in which like numerals represent like elements throughout the several views, FIG. 1 depicts a wireless communication system 100 for direct and immediate transmittal of voice messages over a wireless network, according to the present invention. The illustrated wireless communication system 100 includes mobile devices 102, 104, and 106 (MD 1, MD 2, MD 3, respectively) each in communication with a Base Station System (BSS) 108 or 110. More specifically, MD 1 102 and MD 2 104 are in communication with BSS 108, and MD 3 106 is in communication with BSS 110. The BSSs 108, 110 each include a Base Station Controller (BSC) 116, 118 operatively linked to a Base Transceiver Station (BTS) 112, 114, respectively. It should be understood that the BSSs 108, 110 can include multiple BTSs and/or BSCs. The BSSs 108, 110 are operatively linked to a Mobile Switching Center (MSC) 120, 122, respectively. The illustrated MSCs 120, 122 include a Visiting Location Register (VLR); however, it is contemplated that the MSC and VLR can be separate elements within the wireless communication system 100. The combination MSC/VLR 120, 122 are in communication with a wireless network 124. The means for wireless communication used by wireless network 124 can include, but is not limited to, Time Division Multiple Access (TDMA), Code Division Multiple Access (CDMA), Global System for Mobile communications (GSM), Wideband Code Division Multiple Access (WCDMA), Enhanced Data rates for Global Evolution (EDGE), General Packet Radio Service (GPRS), WiFi, Universal Mobile Telecommunication System (UMTS), Internet Protocol Multimedia Subsystem (IMS), any combination thereof, and the like.

The MSCs 120, 122 are also in communication with a Signaling System No. 7 (SS7) network 126. The SS7 network 126 interconnects a subscriber database 128, a voicemail server 130, a Home Location Register (HLR) 132, and an Equipment Identity Register (EIR) 134 to the MSCs 120, 122. It is contemplated that any signaling protocol and architecture can be implemented to perform signaling functions in the wireless communication network 100.

The subscriber database 128 is configured to store and maintain subscriber information such as, but not limited to, subscriber name, subscriber address, account status (i.e., whether the account is in good standing), subscription type, MD type, MD capabilities, and the like. In the present invention, the subscriber database is used to acquire, for example, subscription type and/or MD capabilities to determine if the recipient user is subscribed to instant voice messaging service. If the recipient is not subscribed, then the subscriber database is used to determine if the recipient mobile device is compatible with instant voice messaging service.

The HLR 132 is a database configured to store routing information for mobile terminated calls and for short message service (SMS) messages. The HLR 132 may also be configured to store and maintain subscriber information.

The subscriber database 128 and the HLR 132 are shown as separate elements, however as described above, both elements can be configured to store and maintain subscriber information. As such, the subscriber database 128 and the HLR 132 can be combined. Alternatively, subscriber information can be sent from the subscriber database 128 to the HLR 132, where the HLR 132 can distribute the subscription information to the requesting VLR or serving GPRS support node (in a GPRS network) through a GPRS attach sequence, in addition to location and routing area information.

The voicemail server 130 stores voicemail from typical voicemail users and also allows for storage of an instant voice message if the recipient MD is either not compatible with instant voice messaging or if the recipient MD user is not subscribed to an instant voice messaging service.

The equipment identity register (EIR) 134 is a database configured to store and maintain International Mobile Equipment Identities (IMEI) for MDs. An IMEI identifies a MD's make, model, and features. The EIR 134 is typically queried to determine if a specific MD has been stolen.

Referring now to FIGS. 2a-2h, the illustrated sender MD 200 is depicted with various screens that represent a progression through a process of identifying a recipient, recording a voice message, and sending the voice message to the recipient. The illustrated sender MD 200 includes a display 202, a keypad 204, a voice message key 206, a soft key menu 210, and hard keys 208 corresponding to the soft key menu 210.

The display 202 can be any type such as, but not limited to, liquid crystal display (LCD), light emitting diode (LED), thin-film transistor (TFT), and the like. The keypad 204 can comprise any number of keys and the keys can be constructed from any type of material. Additionally, the keypad 204 can be any shape, size, color, and texture.

The voice message key 206 can be any input means such as, but not limited to, a hard key, a soft key, a hard button, a soft button, a touch screen, a touch pad, a pointing device, a scroll wheel, a microphone and voice recognition software, or any combination thereof, and the like. As illustrated, the voice message key 206 is a hard key proximate to other hard keys in the keypad 204. Alternatively, the voice message key 206 can be accessed via a soft key in the soft button menu 210 or by any of the above-mentioned input means. The voice message key 206 is used to, for example, record, listen, optionally re-record, retrieve voice messages, and send an instant voice messages.

Figure 2A:
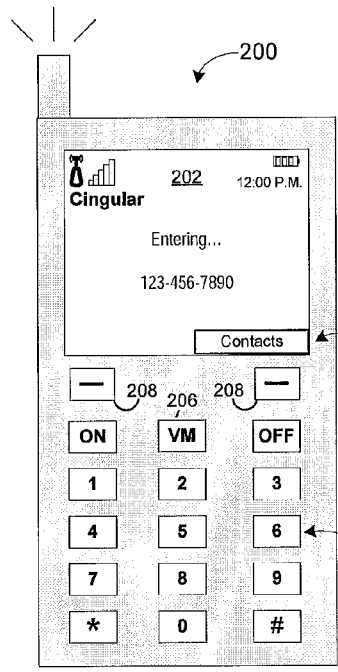
FIGS. 2a-2h illustrate a sender MD and a progression of screens representing exemplary GUIs through a process of identifying a recipient, recording a voice message, and sending the voice message to the recipient, according to the present invention.

As a user progresses through a process of identifying a recipient, recording a voice message, and sending the voice message, the screen depicted on the device display 202 and the soft keys available via the soft key menu 210 change accordingly. The screen shown on the display 202 of FIG. 2a depicts a telephone number entered manually by the user. A Contacts soft key is available via the soft key menu 210. A user can press the hard key 208, associated with the Contacts soft key, to access the user's contacts list.

Figure 2B:
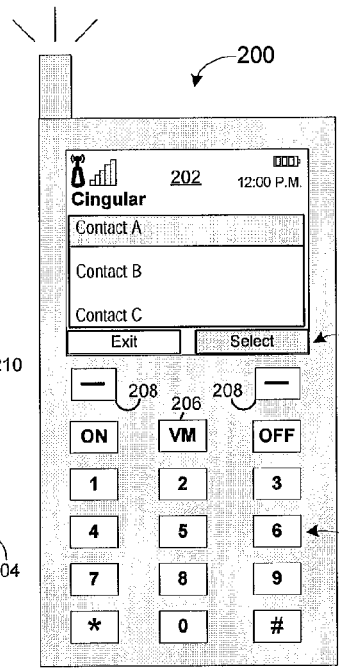
Figure 2C:
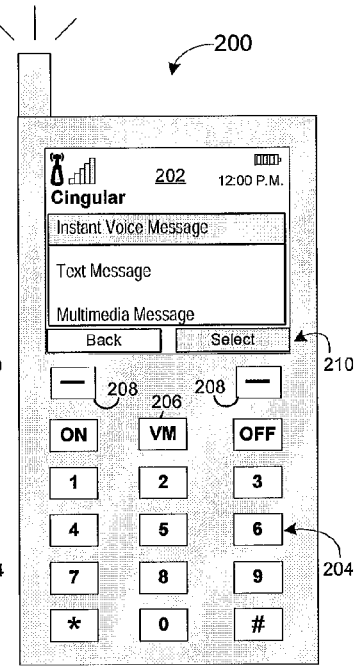

FIG. 2b depicts a user's contact list after the Contacts soft key is pressed. The user's contact list is populated with entries for Contact A, Contact B, and Contact C. Contact A is highlighted and the soft key menu 210 has changed to include Exit and Select soft keys. The user can press the hard key 208 associated with the Select soft key to view the available contact options for Contact A (as shown in FIG. 2c). Alternatively, the user may press the voice message key 206 to instantly access the instant voice message recording screen as depicted in FIG. 2d.

Figure 2D:
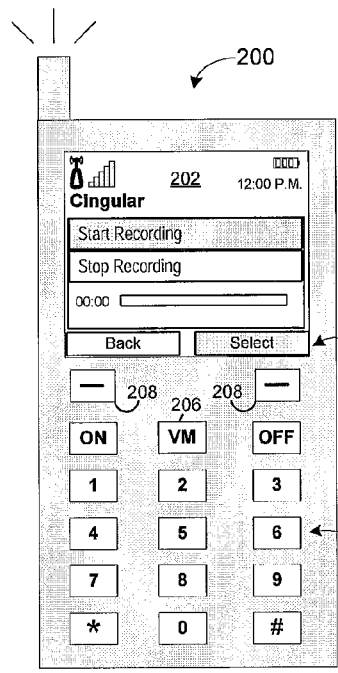
Figure 2E:
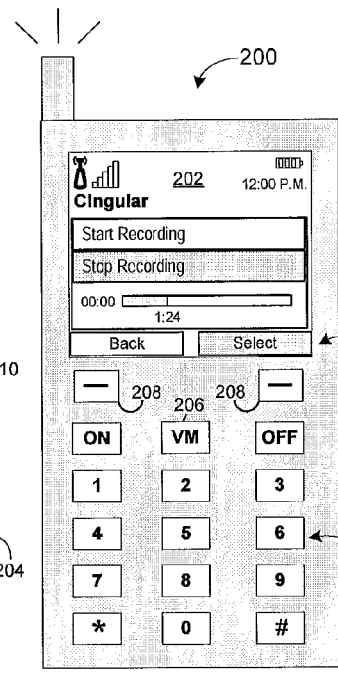

The screen shown on the display 202 of FIG. 2d depicts recording options and an elapsed time bar to indicate the length of the voice message. The soft keys have changed to include Back and Select. To start recording a voice message, the user can press the hard key associated with the Select soft key and begin dictating the voice message. Simultaneously, a stop watch function can start to record the amount of elapsed time during recordation. The elapsed time bar can provide the user with a visual representation of the current elapsed time. For example, the illustrated elapsed time bar indicates the elapsed time with a numeric representation of the elapsed time and a bar graphic extending a portion of the elapsed time bar corresponding to the elapsed time. After recording the voice message, the user can highlight the stop recording option and press the hard key 208 associated with the Select soft key to stop recording. After the voice message is recorded, the elapsed time bar indicates the amount of elapsed time, as shown in FIG. 2e.

Figure 2F:
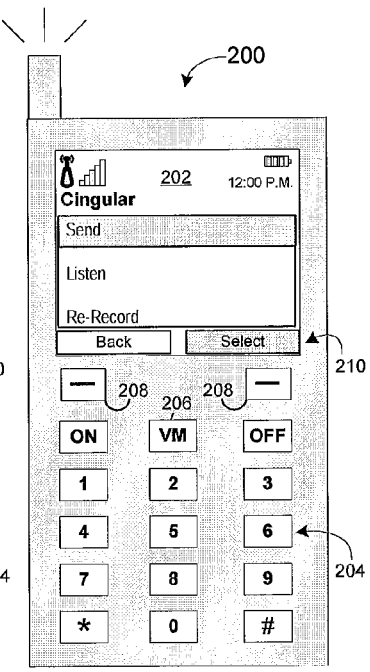
Figure 2G:
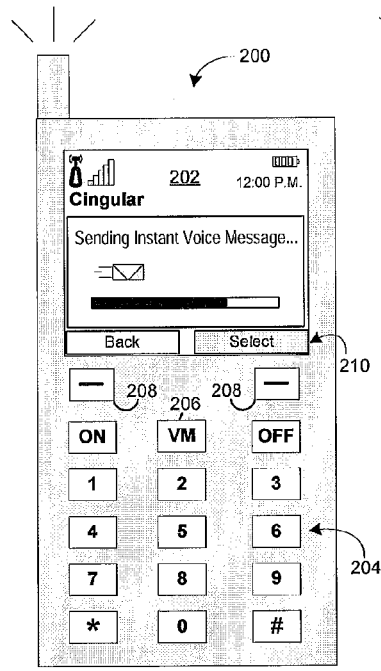
Figure 2H:
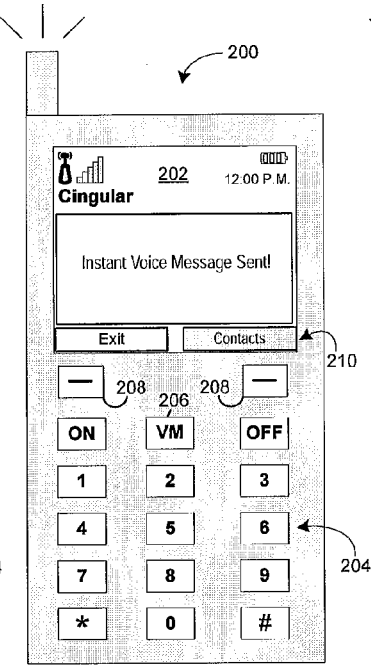

FIG. 2f shows the available options after the voice message is recorded, namely Send, Listen, or Re-record. It is contemplated that this menu can be accessed by a soft key (not shown) on the soft key menu 210, or by pressing the voice message key 206. If the user selects the Listen option, the previously recorded voice message is played. The user may elect to terminate the listen option at any time during playback. If the user selects the Re-record option, the screen on the display 202 can revert back to the screen shown in FIG. 2d. If the user selects the Send option, the user can be notified that the instant voice message is being sent, for example, as shown in FIG. 2g. Alternatively, the user can press the voice message key 206 to immediately send the voice message without first selecting the send option. The voice message key 206 can also be used after the voice message is recorded to immediately send the message without first accessing an options menu as shown in FIG. 2f. In addition, the user can be notified that the instant voice message, for example, as shown in FIG. 2h.

Figure 2I:
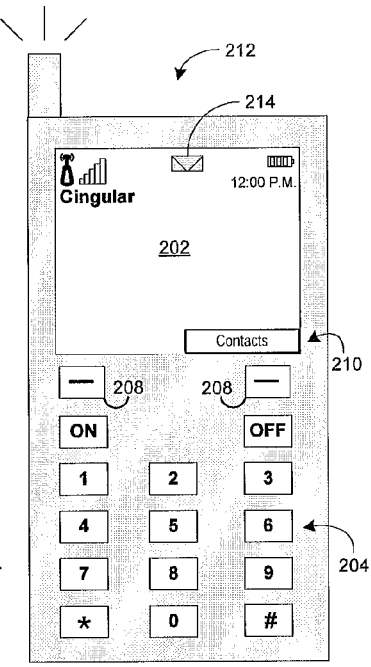
FIGS. 2i-2j illustrate recipient MDs with and without instant voice messaging subscriptions, according to the present invention.
Figure 2J:
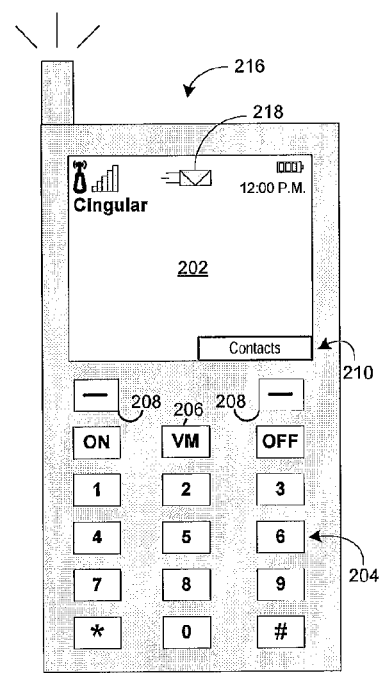

Referring now to FIGS. 2i-2j, recipient MDs with and without instant voice messaging subscriptions are shown. More specifically, FIG. 2i depicts an unsubscribed recipient MD 212 and FIG. 2j depicts a subscribed recipient MD 216. Each recipient MD 212, 216 includes a message waiting indicator (MWI) to inform the recipient of a new voice message. The illustrated MWIs 214 and 218 are distinguishable to represent a voice message stored on the recipient's MD and a voice message stored on a voicemail server, respectively. MWI 214 will hereinafter be referred to as voice message waiting indicator (VMWI) 214. MWI 218 will hereinafter be referred to as instant voice message waiting indicator (IVMWI) 218. The message waiting indicator for traditional voice messages will hereinafter be referred to as traditional message waiting indicator (TMWI). VMWI 214, IVMWI 218, and TMWI are hereinafter collectively referred to as message waiting indicators (MWI). It is contemplated, however, that the MWI can be the same for recipient MDs with and without instant voice messaging subscriptions, the only requirement being that the voice message is sent via an instant voice messaging method. This MWI can be distinguishable from the MWI typically used for traditional voice messages, to notify the recipient that the sender used an instant voice messaging service. In this case, a recipient MD that is subscribed to an instant voice messaging service may receive one or more instant voice messages and one or more traditional voice messages and both of the corresponding MWIs would be shown on the display 202. Moreover, for a MD that is not subscribed to an instant voice messaging service, the MWI may be the same for both voice messages whether sent to the voicemail server via standard methods or by an instant voice messaging method.

Figure 3:
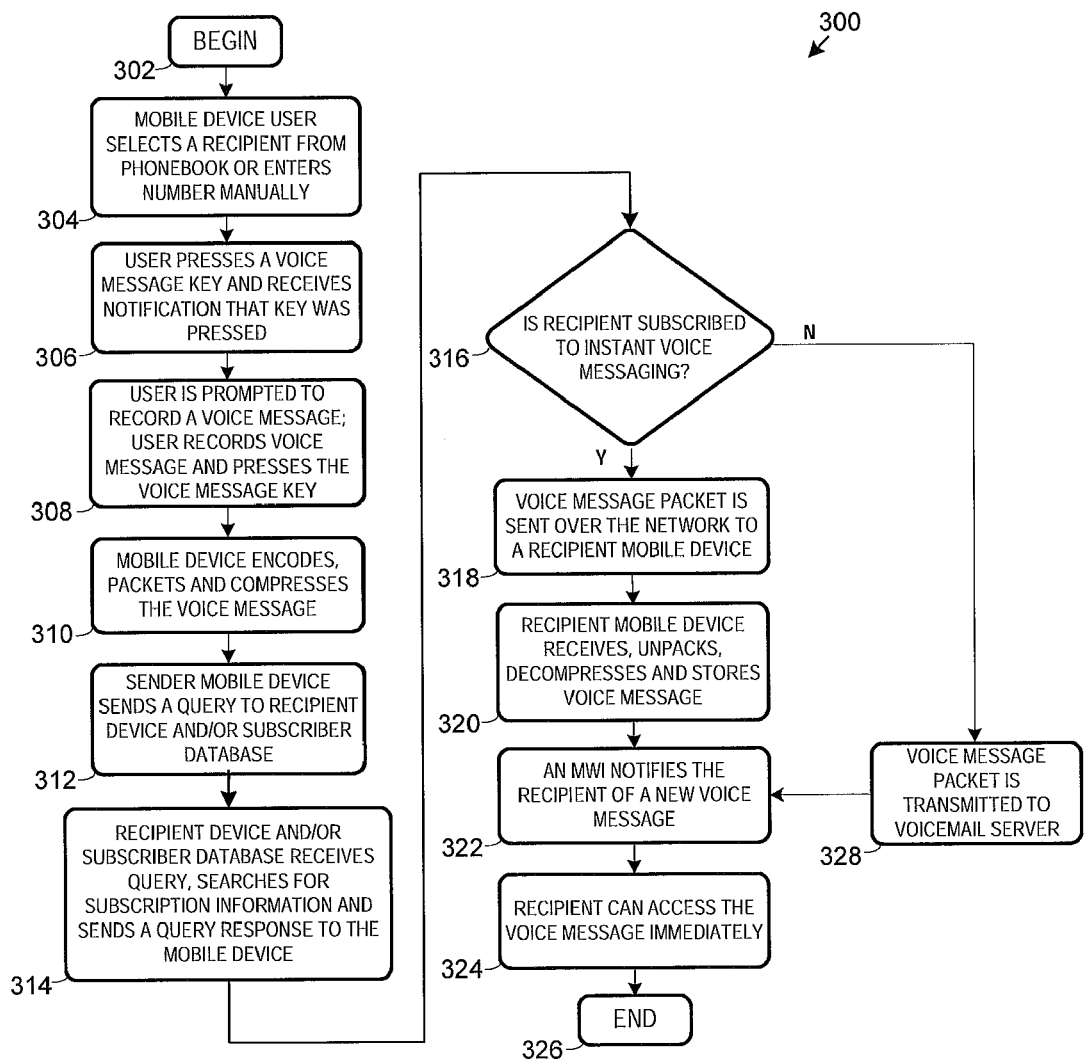
FIG. 3 is a flow chart of an exemplary method for directly sending a voice message from a sender MD to a recipient MD over a wireless network, according to the present invention.

Referring now to FIG. 3, a flow chart of an exemplary method 300 for directly sending a voice message from one sender MD to one or more recipient MDs via a wireless communication system 100 is shown. To aid in teaching the exemplary method 300, MD 1 102 is designated as the sender MD and MD 3 106 is designated as the recipient MD. The exemplary method 300 is now described with reference to FIG. 1 and FIGS. 2a-2j.

The exemplary method 300 begins at step 302 and proceeds to step 304 where a MD user can identify an instant voice message recipient. The user can either manually enter a telephone number (as shown in FIG. 2a), or select a recipient from a contact list, an address book, a phonebook, and the like (as shown in FIG. 2b). After the user identifies an instant voice message recipient, the exemplary method proceeds to step 306, where the user presses a voice message key 206. Upon pressing the voice message key 206, the user can be presented with a screen, for example, as shown in FIG. 2d. It is contemplated that the user need only highlight the recipient; for example, Contact A in FIG. 2b, then press the voice message key 206. Alternatively, as shown in FIG. 2b, the user can select a contact; for example, by pressing the hard button 208 associated with the Select soft key (as shown in FIG. 2c) and be presented with a menu of contact options for that user. If the voice message key 206 is utilized, the user can receive a notification that the voice message key 206 was pressed. The notification can comprise an icon, a message, and/or an audible tone. Moreover, the notification can be set to a default icon, message, and/or audible tone that may later be changed to accommodate a user's preferences.

After the notification, the method proceeds to step 308, where the user is given recording options, as best shown in FIG. 2d and FIG. 2e. The user can select the start recording option and begin dictating a voice message. After the user is finished recording a voice message, the user can select the stop recording option. The user may then be provided with an options menu comprising options to send, listen, and re-record the voice message (as shown in FIG. 2f). Alternatively, the options available in FIG. 2f can be incorporated into the recording options in FIGS. 2d and 2e. After the user is satisfied with the recorded voice message, the user can either select the send menu option by pressing the hard key 208 associated with the Select soft key, or the user can press the voice message key 206 to initiate a send sequence. The exemplary method then proceeds to step 310.

In step 310, the voice message is encoded and divided into packets. The voice message packets are then compressed in preparation to be sent to a recipient MD (e.g., MD 3 106). It is contemplated that encoding the voice message, dividing the encoded voice message into packets, and compressing the voice message packets can be accomplished by any method or combination of methods known to those skilled in the art. The exemplary method then proceeds to step 312.

Figure 4:
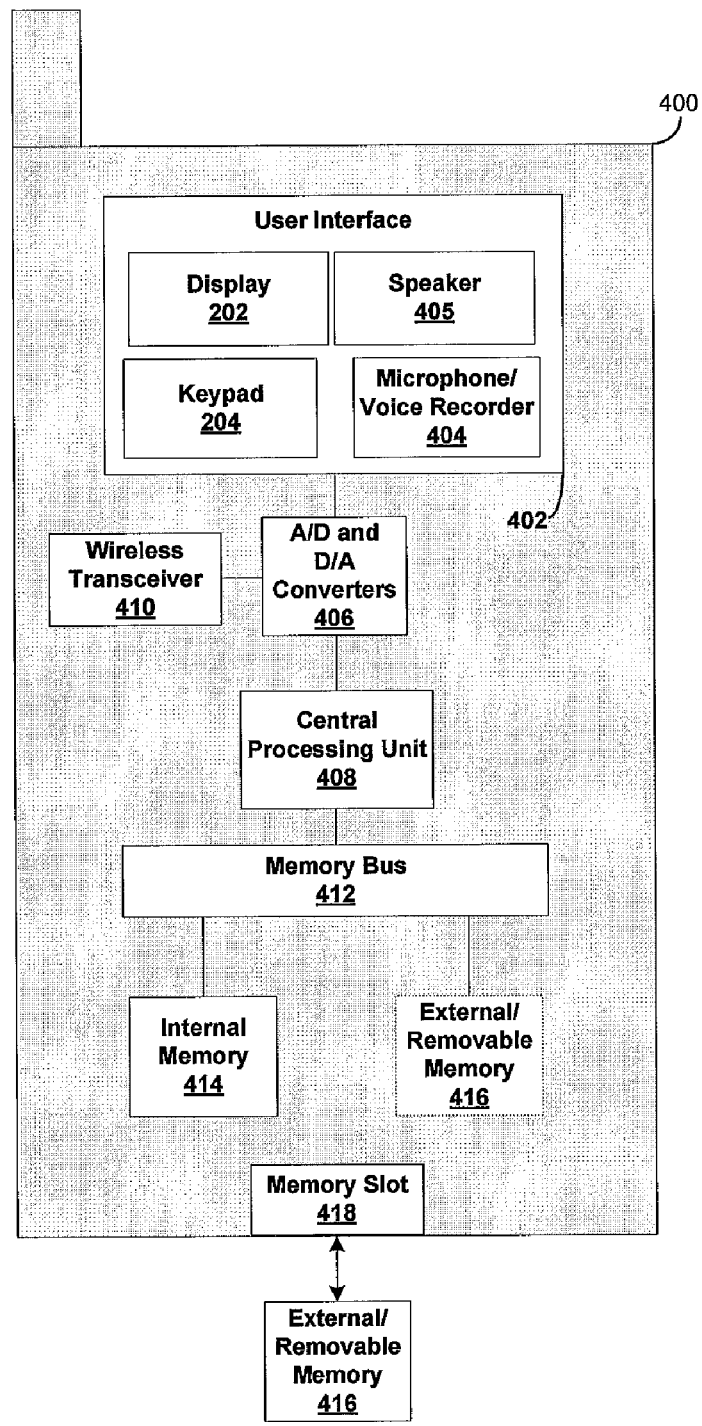
FIG. 4 is illustrates MD components capable of processing an instant voice message, according to the present invention.

In step 312, the MD 1 106 sends a query to MD 3 106 and/or a database (e.g., subscriber database 128 or HLR 132), and awaits a response. The query can comprise a request, for example, for subscription information. This subscription information can be stored, for example, in a Subscriber Identity Module (SIM) in a GSM network, in a Universal Subscriber Identity Module (USIM) in a UMTS network, in a similar module in a CDMA-based network, and/or stored on a device readable memory of the MD (e.g., internal memory 414 and/or external/removable memory 416 as shown in FIG. 4).

In a CDMA-based network, such as CDMA2000, the recipient MD's Electronic Serial Number (ESN) can be used to access the MD information stored in a corresponding field of the subscriber database 128. It should be understood that the subscriber database 128 is described as the searched database; however, an HLR (e.g., HLR 132) may also be used. For example, the query can request the ESN of the recipient MD and send the ESN to the subscriber database 128 for comparison.

In step 314, the subscriber database 128 can search for information stored in a subscription database field corresponding to the ESN and/or subscription information found in the memory and/or other device (e.g., a SIM or USIM) of MD 3 106. Alternatively and regardless of the technology used, the query can be sent directly to the subscriber database 128 and use, for example, the recipient's telephone number to search the subscriber database 128 and obtain the MD information without first querying MD 3 106. The latter method may also be used if MD 3 106 is not available, for example, it is powered off.

After the subscription information is obtained from MD 3 106 and/or the subscriber database 128, a query response is sent to MD 1 102. The query response is used to indicate whether the user of MD 3 106 is subscribed to instant voice messaging service. The query response can comprise, for example, a digit string, a character string, a string of bits, or the like, to identify MD 3 106 as being subscribed or not subscribed to an instant voice messaging service. As with other wireless services such as text messaging and multimedia text messaging, it is contemplated that a user can be given the options to either pay-per-use, subscribe to an instant voice messaging service plan, or opt-out of the service. This and other pertinent information may be exchanged in the query and query response. It should be understood that this information can determine the way the instance voice message is routed. For example, if a recipient MD is compatible with instant voice messaging service, but the user has elected to opt-out of the service, then the instant voice message would be sent directly to the voicemail server 130. After the query response is received at MD 1 102, the method proceeds to step 316, where the query response is deciphered.

If it is determined, in step 316, that the user of MD 3 106 is subscribed to instant voice messaging service, the method proceeds to step 318 and the voice message packets are sent via the wireless network 124 to MD 3 106.

In step 320, MD 3 106 receives the voice message packet. Upon receipt, the voice message packets are decompressed, unpacked, decoded, and stored in a device readable memory, for example, internal memory 414 or external/removable memory 416. The method by which the voice message packets are decompressed, unpacked, and decoded can be any method(s) known to those skilled in the art.

In step 322, an IVMWI 218 can be displayed to inform the recipient of a new voice message. After the IVMWI 218 is displayed, the method 300 proceeds to step 324, where the recipient can access the voice message. The recipient can access the instant voice message by pressing the voice message key 206 on the recipient MD, or alternatively, a different key can be used to access the voice message. It is contemplated that the recipient can define which key is used for instant voice messaging functions. The instant voice message can also be accessed via a menu as is typically done for accessing text and multimedia messages. Alternatively, the instant voice message can be forwarded to the voicemail server 130, for example, if MD 3 106 is powered off. Upon re-registration (i.e., powering up) the voicemail server 130 can be triggered to send the stored instant voice message to MD 3 106, where the instant voice message can be stored. The method then proceeds to step 326 and the method ends.

In step 316, if the recipient is not subscribed to instant voice messaging service, the method proceeds to step 328, where the voice message packets are transmitted directly to the voicemail server 130. The voicemail server 130 receives the voice message packet. Upon receipt, the voice message packets are decompressed, unpacked, decoded, and stored in a device readable memory of the voicemail server 130. Instant voice messages and traditional voice messages stored in the voicemail server 130 can both be accessed by the recipient via a current method (e.g., calling the voicemail server 130 and accessing a subscriber-specific voicemail box). It should be understood that although both the instant voice message and the traditional voice message are stored on the voicemail server 130, the method by which the different types of voice message are transmitted are different.

In step 322, a VMWI 214 can be displayed to inform the recipient of a new voice message. After the VMWI 214 is displayed, the method 300 proceeds to step 324, where the recipient can access the instant voice message. In this embodiment, the user can access the instant voice message by calling the voicemail server 130. The method then proceeds to step 326 and the method ends.

It is contemplated that the sender MD can receive notification that the recipient MD is not subscribed to instant voice messaging service and that the voice message will be stored in a voicemail server. The notification can occur before the message is sent and after receipt of a query response. For example, the notification informs the sender that the voice message will not be sent to the recipient's MD, instead the voice message will be sent to a voicemail server where the recipient can retrieve the voice message. The sender can also be provided an option to cancel transmission of the voice message.

In the exemplary embodiment described above, the query is used to determine if the recipient is subscribed to instant voice messaging service, however, it is contemplated that in alternative embodiments, MD compatibility information can be obtained through a query to the database and/or the recipient MD. If it is determined that the MD is compatible with instant voice messaging, then an instant voice message can be sent to the recipient MD and the recipient billed appropriately.

In further alternative embodiments, the sender MD does not query the recipient MD or a database. Instead, the sender MD communicates directly with its own network voicemail server or other network element. Then, the home network queries the recipient MD and/or one or more recipient network elements (e.g., a database) to determine if the recipient mobile device is subscribed to or compatible with instant voice messaging.

Referring now to FIG. 4, an exemplary MD 400 and its components are shown. The illustrated MD 400 includes a user interface 402 operatively linked to analog-to-digital (ND) and digital-to-analog (D/A) converters 406, which in turn are operatively linked to a central processing unit (CPU) 408 and a wireless transceiver 410. The CPU 408 is operatively linked to a memory bus 412, which in turn is operatively linked to an internal device readable memory 414 and an external/removable memory 416. The MD 400 is also configured with a memory slot 418 so that external/removable memory 416 may be removably inserted into MD 400.

The illustrated user interface 402 includes a display 202, a keypad 204, a speaker 405, and a microphone/voice recorder 404. The display 202 can be any type such as, but not limited to, liquid crystal display (LCD), light emitting diode (LED), thin-film transistor (TFT), and the like. The keypad 204 can comprise any number of keys and the keys can be constructed from any type of material and can be any shape, size, color, and texture. In particular, the keypad 204 for an instant voice message compatible MD can include a voice message key 206, as best shown in FIGS. 2a-2j. The microphone/voice recorder 404 can utilize any hardware and/or recording software known to those skilled in the art.

The CPU 408 and memory bus 412 should be sufficient to handle the additional processing and memory storage duties associated with implementing the present invention. The CPU 408 and memory bus 412 architectures can be any type known to those skilled in the art, and the corresponding memory types used by the internal memory 414 and the external/removable memory 416 can be, for example, compact flash (CF), secure digital (SD), memory stick (MS), multimedia card (MMC), xD-picture card, smart media (SM), read-only memory (ROM), random access memory (RAM), and/or a hybrid of ROM and RAM.

Figure 5:
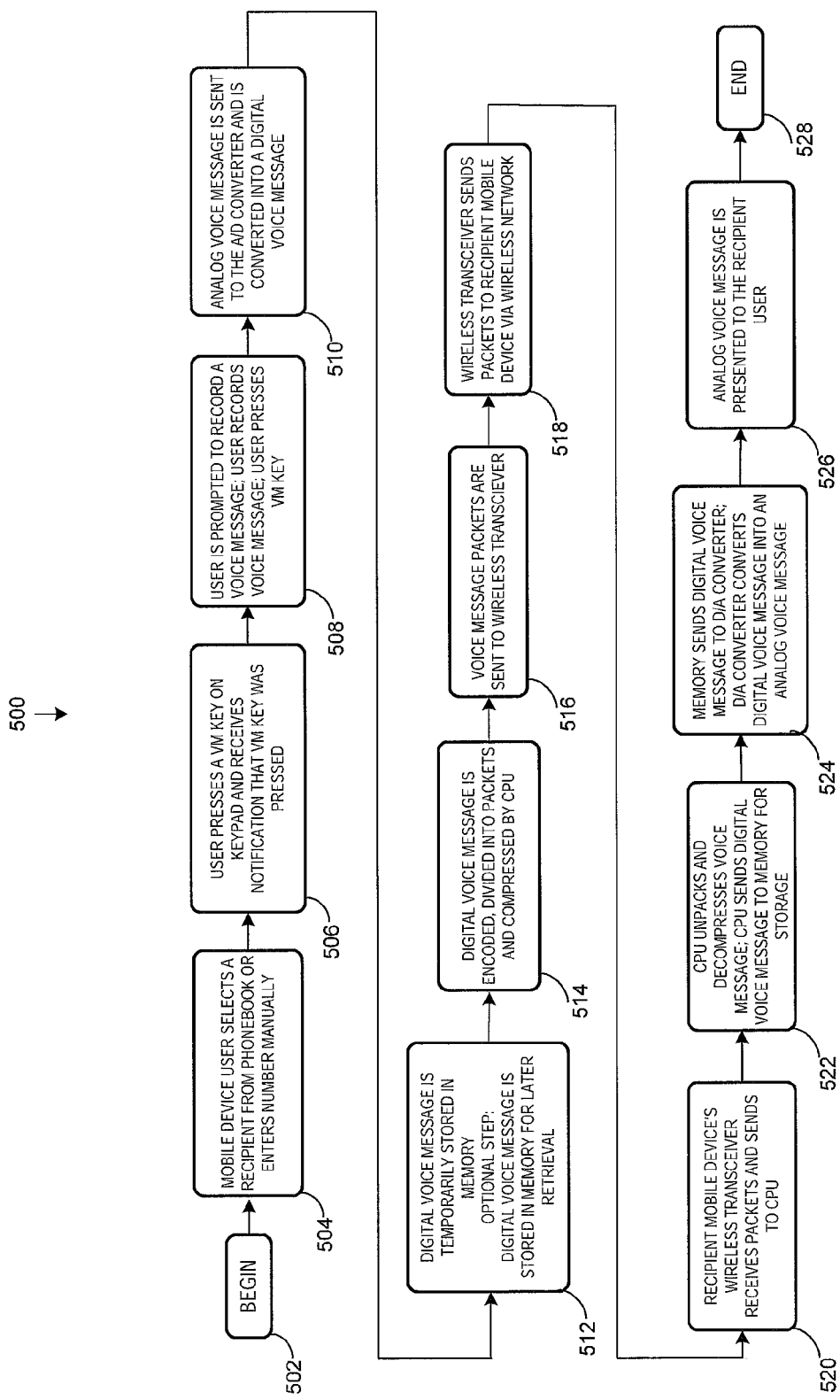
FIG. 5 is a flow chart of an exemplary method for processing an instant voice message in a MD, according to the present invention.

Referring now to FIG. 5, an exemplary method 500 for processing an instant voice message in MD 400 is shown. It should be understood that some specifics described with reference to the other figures have been intentionally left out of the following description so as not to obscure the explanation of the processes performed by MD 400. The method 500 starts at step 502 and proceeds to step 504 where a MD user can identify an instant voice message recipient. After the user identifies an instant voice message recipient, the exemplary method proceeds to step 506, where the user presses a voice message key, for example, voice message key 206. The user can receive a notification after the voice message key 206 is pressed. The notification can comprise an icon, a message, and/or an audible tone. The icon and/or message are presented to the MD user on the display 202 and/or the audible tone is sent through the speaker 405 to notify the user that the voice message key 206 was pressed.

After the notification, the method proceeds to step 508 where the user can be provided with recording options, as best shown in FIG. 2d and FIG. 2e. The user can then select the start recording option and begin dictating a voice message. After the user records a voice message, the user may be provided with an options menu comprising options to send, listen, and re-record the voice message (as shown in FIG. 2f). The method then proceeds to step 510.

In step 510, the analog voice message is sent to the ND converter 406, where the analog voice message is converted into a digital voice message. In step 512, the digital voice message is either temporarily stored in memory (i.e., until the message is sent) or stored in memory for later retrieval. It is contemplated that the user may be given an option to store the voice message at any time during this or any of the other accompanying processes. It should be understood that steps 508, 510, and 512 may occur concurrently. That is, the message is sent in real-time (as the user dictates the message) to the A/D converter 406 and the resulting digital voice message is temporarily stored in the internal memory 414, the external memory 416, or in a cache memory of the CPU 408.

In step 514, the digital voice message is then encoded, divided into packets, and compressed by the CPU 408. The resulting voice message packets are sent to the wireless transceiver 410 in step 516. In addition, a query comprising the identifying information for the recipient MD, for example, a telephone number, may also be encoded, divided into packets, and compressed by the CPU 408. In step 518, the wireless transceiver 410 receives the voice message packets and transmits them via the wireless network 100 to the recipient MD. If a query packet is used, the voice message packets can be placed in a queue until a query response is received. As previously described, the query response can include information regarding recipient device compatibility and/or subscription information.

If the recipient is subscribed to instant voice messaging service, then the voice message packets can be sent via the wireless transceiver 410 on the sender MD (e.g., MD 1 102) to the wireless transceiver 410 on the recipient MD (e.g., MD 3 106). The wireless transceiver 410 then sends the voice message packets to the recipient MD's CPU 408, as described in step 520. If the recipient is not subscribed to instant voice messaging service, then the voice message packets are routed to the appropriate voicemail server (e.g., voicemail server 130) and stored. Alternatively, or in addition, if the recipient MD is compatible with instant voice messaging service, then the voice message packets can be sent via the wireless transceiver 410 on the sender MD to the wireless transceiver 410 on the recipient MD, and subsequently sent to the recipient MD's CPU 408, as described in step 520. If the recipient MD is not compatible with instant messaging service, then the voice message packets are routed to the appropriate voicemail server.

In step 522, the CPU 408 decodes, unpacks, and decompresses the voice message packets and sends the digital voice message to memory (e.g., internal memory 414 and/or external memory 416). The D/A converter component of the ND and D/A converters 406 receives the digital voice message and converts it into an analog voice message at step 524. The analog voice message is presented to the recipient at step 526. An IVMWI 218 can then be displayed to inform the recipient of a new instant voice message. If the recipient MD is not powered on, the instant voice message can be sent to the voicemail server 130 and stored. Upon re-registration of the recipient MD (i.e., powering up), the voicemail server 130 can be triggered to send the stored instant voice message to the recipient MD, where the instant voice message can be stored. The method 500 ends at step 528.

In an alternative embodiment, the voice message packets can be sent directly to the appropriate voicemail server and stored. After which, the voicemail server can forward the voice message packets to the recipient MD for handset storage and retrieval.

Figure 6:
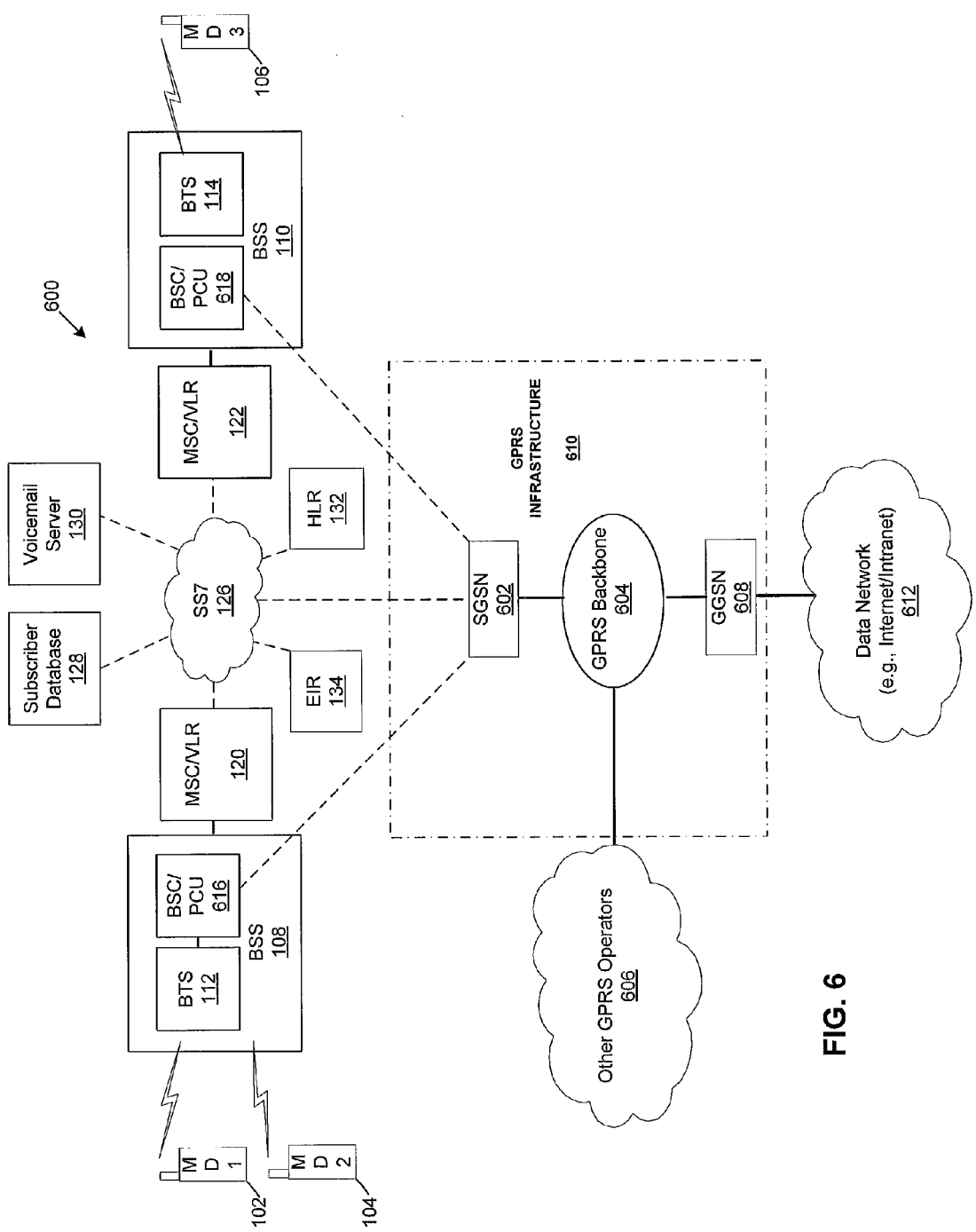
FIG. 6 is a block diagram illustrating a wireless communication system for direct and immediate transmittal of voice message over a General Packet Radio Service (GPRS) network, according to the present invention.

Referring now to FIG. 6, a block diagram illustrating a General Packet Radio Service (GPRS) system 600 for direct and immediate transmittal of voice messages is shown. The illustrated GPRS system 600 includes MDs 102, 104, and 106 each in communication with a Base Station System (BSS) 108 or 110. More specifically, MD 1 102 and MD 2 104 are in communication with BSS 108, and MD 3 106 is in communication with BSS 110. The BSSs 108, 110 each include a Base Station Controller (BSC)/Packet Control Unit (PCU) 616, 618 operatively linked to a Base Transceiver Station (BTS) 112, 114, respectively. The BTSs 112, 114 are connected to antennas for radiating transmitted signals and for receiving incoming signals. It should be understood that the BSSs 108, 110 can include multiple BTSs and/or BSC/PCUs. The PCU portion of the BSC/PCU 616, 618 combination is responsible for controlling the radio related aspects of the GPRS system 600. The BSSs 108, 110 are operatively linked to a Mobile Switching Center (MSC) 120, 122, respectively. The illustrated MSCs 120, 122 include a Visiting Location Register (VLR); however, it is contemplated that the MSC and VLR can be separate elements within the wireless communication system 100. The MSCs 120, 122 are in communication with a Signaling System No. 7 (SS7) network 126. The SS7 network 126 interconnects a subscriber database 128, a voicemail server 130, a Home Location Register (HLR) 132, and an Equipment Identity Register (EIR) 134 to the MSCs 120, 122.

It is contemplated that any signaling protocol and architecture can be implemented to perform signaling functions in the wireless communication system 100.

The subscriber database 128 is configured to store and maintain subscriber information such as, but not limited to, subscriber name, subscriber address, account status (i.e., whether the account is in good standing), subscription type, MD type, MD capabilities, and the like. In the present invention, the subscriber database is used to acquire, for example, subscription type and/or MD capabilities to determine if the recipient user is subscribed to instant voice messaging service and, if not, to determine if the recipient MD is compatible with instant voice messaging service.

The HLR 132 is a database configured to store routing information for mobile terminated calls and for short message service (SMS) messages. The HLR 132 may also be configured to store and maintain subscriber information.

The subscriber database 128 and the HLR 132 are shown as separate elements, however as described above, both elements can be configured to store and maintain subscriber information. As such, the subscriber database 128 and the HLR 132 can be combined. Alternatively, subscriber information can be sent from the subscriber database 128 to the HLR 132, where the HLR 132 can distribute the subscription information to the requesting VLR or serving GPRS support node (in a GPRS network) through a GPRS attach sequence, in addition to location and routing area information.

The voicemail server 130 stores voicemail from typical voicemail users and also allows for storage of an instant voice message if the recipient MD is either not compatible with instant voice messaging or if the recipient MD user is not subscribed to an instant voice messaging service.

The equipment identity register (EIR) 134 is a database configured to store and maintain International Mobile Equipment Identities (IMEI) for MDs. An IMEI identifies a MD's make, model, and features. The EIR 134 is typically queried to determine if a specific MD has been stolen.

The subscriber database 128 is configured to store subscriber data such as, but not limited to, subscriber name, subscriber address, account status (i.e., whether the account is in good standing), subscription type, MD type, and MD capabilities. In the present invention, the subscriber database is used to acquire, for example, subscription type and MD capabilities to determine if the recipient MD user is subscribed to instant voice messaging and, if not, if the recipient MD is compatible with instant voice messaging. The voicemail server 130 stores voicemail from typical voicemail users and also allows for storage of an instant voice message if the recipient MD is either not compatible with instant voice messaging or if the recipient MD user is not subscribed to an instant voice messaging service.

The SS7 network 126 is also in communication with a serving GPRS support node (SGSN) 602, which provides a link to the GPRS backbone 604. The GPRS backbone 604 interconnects other GPRS operators 606 and a gateway GPRS support node (GGSN) 608, which provides a link to data network 612 (e.g., the Internet or various Intranets). The SGSN 602, the GPRS backbone 604, and the GGSN 608 comprise the GPRS infrastructure 610. It is contemplated that additional elements, for example, firewalls and other security elements may be incorporated into the GPRS infrastructure 610; however, these have not been included in the illustrated GPRS network 600 so as not to obscure the present invention. In addition, signaling trunks provided by the SS7 network 126 may be controlled via another signaling network known to those skilled in the art.

Figure 7:
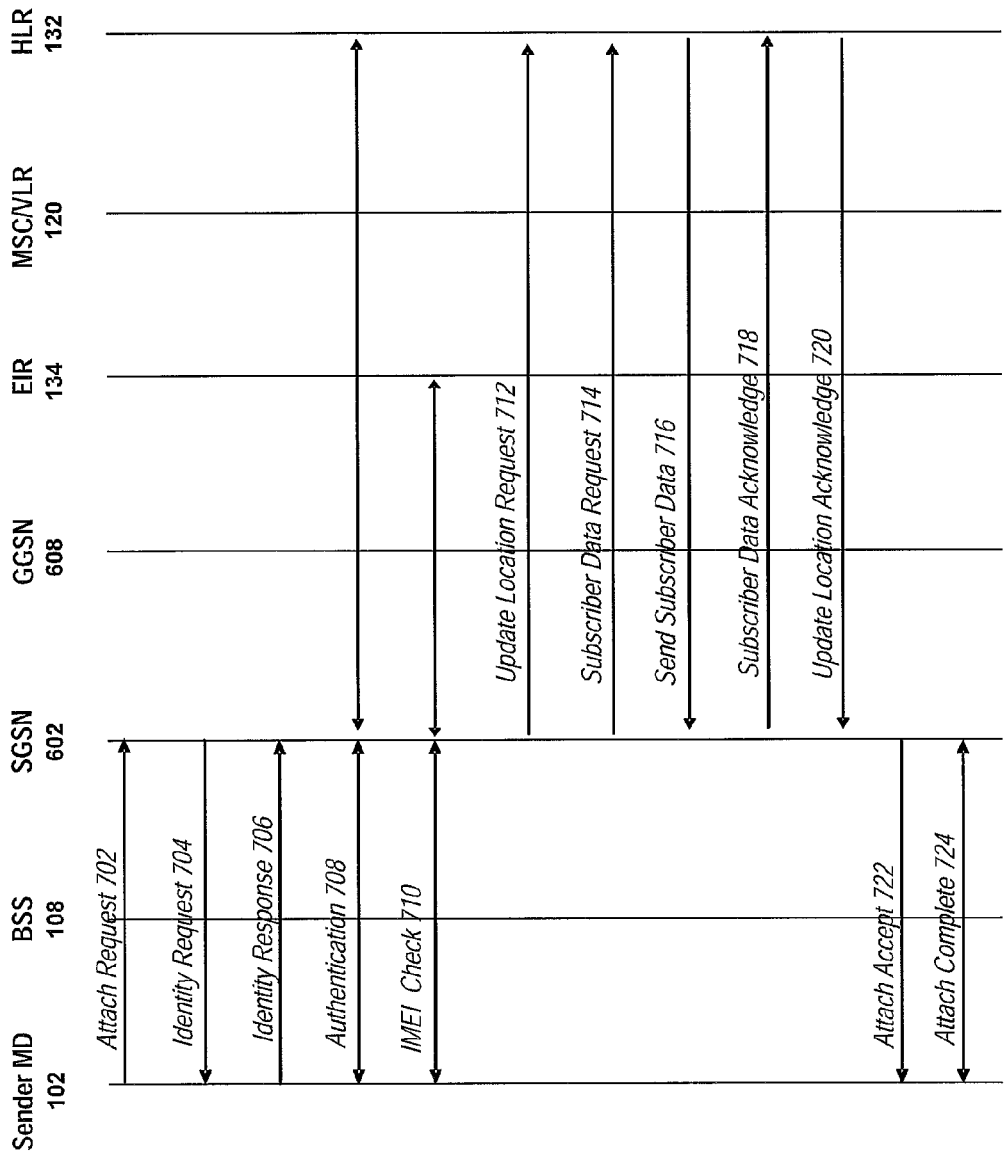
FIG. 7 illustrates a GPRS attach sequence chart.

Referring now to FIG. 7, a GPRS attach sequence 700 is shown. A GPRS attach is used to connect a MD user to the GPRS network 600. Typically, a MD can be attached (i.e., connected) to the GPRS network 600 upon re-registration with the core network (e.g., a GSM network), or by user or service provider induced functions such as a user accessing requesting Internet access from a MD. Once attached, the MD user can access the Internet and perform other packet switched tasks such as, Short Message Service (SMS) messaging and Multimedia Message Service (MMS) over the GPRS network 600. In an exemplary embodiment of the present invention, the GPRS network 600 is used to send instant voice messages to other MD users.

The illustrated GPRS attach sequence 700 includes a sender MD (e.g., MD 1 102), BSS 108, SGSN 602, GGSN 608, EIR 134, MSC/VLR 120, and HLR 132. To initiate a GPRS attach, MD 1 102 sends an Attach Request 702 through the BSS and more particularly routed through the BSC/PCU 616 to the SGSN 602. The Attach Request 702 comprises the previously used Temporary Mobile Subscriber Identity (TMSI), the network identity, and location and routing information. The SGSN 602 processes the Attach Request 702 by searching for the TSMI in its database. If the TMSI is not found, then the SGSN sends an Identity Request (not shown) to the old SGSN. The old SGSN is the SGSN to which the MD was most recently connected. The old SGSN searches its database and provides the International Mobile Subscriber Identity (IMSI) to SGSN 602. SGSN 602 then sends an Identity Request 704 to MD 1 102. The Identity Request 704 can request the IMSI of MD 1 102. MD 1 102 responds in an Identity Response 706, which, for example, can contain the IMSI of MD 1 102.

The SGSN 602 and MD 1 102 then perform an Authentication 708 process. The Authentication 708 comprises a random value and a secret key sent by the SGSN 602 to MD 1 102, where the SIM of MD 1 102 receives the random value and secret key and applies various algorithms to formulate a session key. This session key is only used between MD 1 102 and the SGSN 602 to setup and maintain a secure connection.

After the Authentication 708 process, an IMEI Check 710 is performed. During IMEI Check 710, MD 1 102 sends its International Mobile Equipment Identity (IMEI) to the SGSN 602. The SGSN 602 receives the IMEI and sends an IMEI Check Request (not shown) to the Equipment Identification Register (EIR) 134. The EIR 134 searches its database for the status (i.e., if the MD is stolen) of MD 1 102 by comparing the IMEI with its database contents. Afterwards, the EIR 134 sends a response back to the SGSN 602.

After the IMEI Check 710, the SGSN 602 sends the new location of MD 1 102 to HLR 132 in an Update Location Request 712. Typically, this occurs periodically while MD 1 102 is attached to the GPRS network 600. That is, as MD 1 102 moves and is served by different SGSNs, each new SGSN informs the HLR 132 of the new location of MD 1 102 and the HLR 132 informs the old SGSN that MD 1 102 has moved. The SGSN 602 then sends a Subscriber Data Request 714 to the HLR 132 to obtain subscriber information, for example, subscriber name, subscriber address, account status (i.e., whether the account is in good standing), subscription type, MD type, and MD capabilities. Alternatively, the subscriber data base 128 can be used to obtain subscriber information, or a combination of the HLR 132 and the subscriber database 128. The HLR 132 sends the subscriber data 716 to the SGSN 602 and the SGSN 602 sends a Subscriber Data Acknowledgement 718 to the HLR 132. The HLR 132 then sends an Update Location Acknowledgement 720 to complete the update.

The SGSN 602 then sends an Attach Accept 722 message to MD 1 102. An Attach Complete 724 message identifies the completion of the attach procedure.

Figure 8:
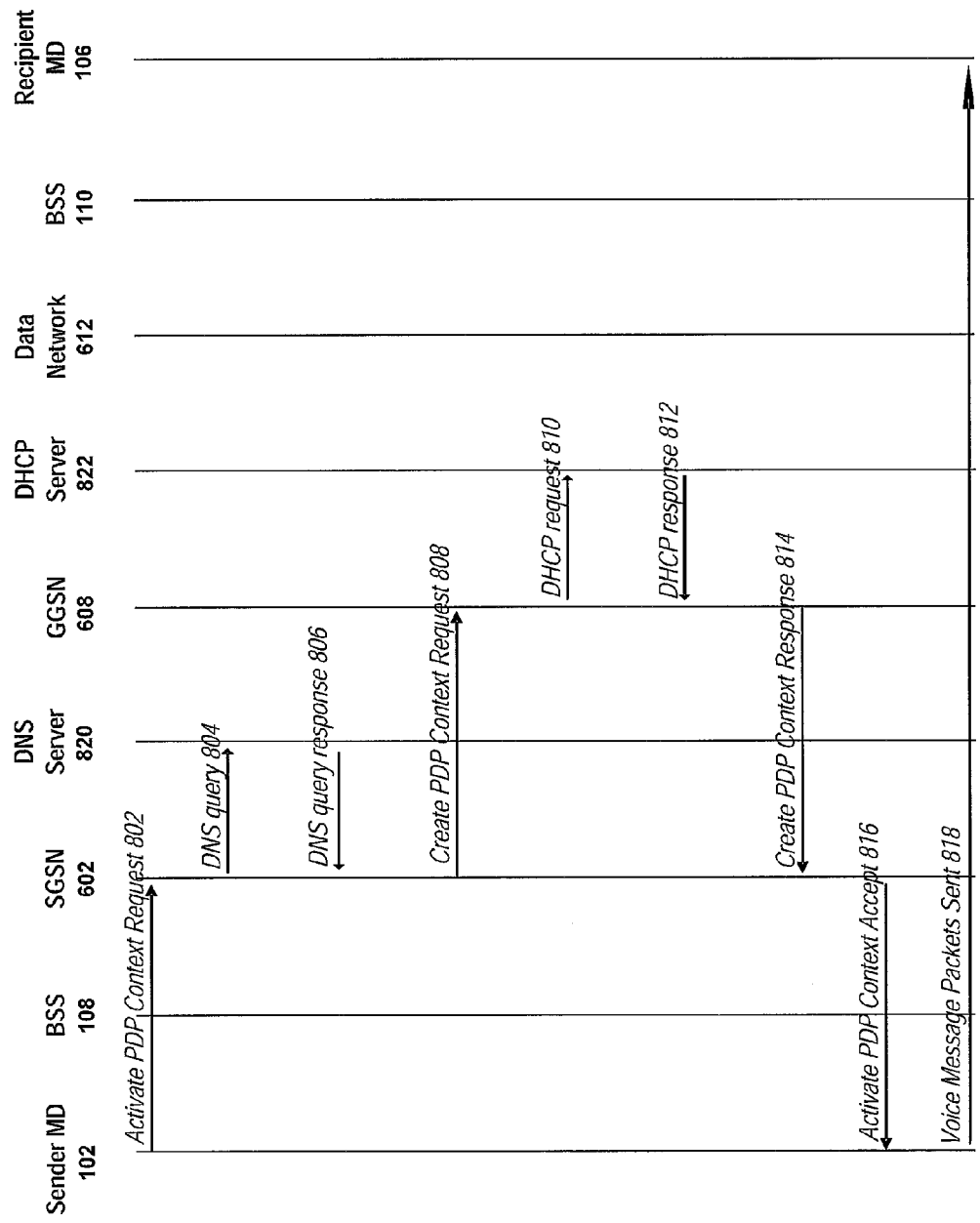
FIG. 8 illustrates a modified Packet Data Protocol (PDP) activation sequence chart, according to the present invention.

Referring now to FIG. 8, MD 1 102 can now initiate a Packet Data Protocol (PDP) context activation sequence to obtain an Internet Protocol (IP) address. First, MD 1 102 sends an Activate PDP Context Request 802 to the SGSN 602. In the Activate PDP Context Request 802, MD 1 102 can send the Access Point Name (APN) provided by its service provider. The SGSN 602 receives the Activate PDP Context Request 802 and initiates a Dynamic Name Server (DNS) query 804 to find the GGSN, for example GGSN 608, corresponding to the APN provided by MD 1 102. The DNS server 820 assigns an IP address to GGSN 608 and sends a DNS query response 806 to SGSN 602. SGSN 602 receives the DNS query response 806 and sends a Create PDP Context Request 808 to GGSN 608. The Create PDP Context Request 808 can comprise subscriber information for MD 1 102 to effectively create a context defining routing profiles, Quality of Service (QoS), security, and billing information. The GGSN 608 can receive the Create PDP Context Request 808 and request a dynamic IP address for MD 1 102 by sending a Dynamic Host Configuration Protocol (DHCP) request 810 to a DHCP server 822. The DHCP server 822 then creates a DHCP response 812 and sends it to the GGSN 608. The GGSN 608 can compile the dynamic IP address and the context information into a Create PDP Context Response 814 and send it to the SGSN 602. The SGSN 602 receives the Create PDP Context Response 814 and sends an Activate PDP Context Accept 816 to MD 1 102. This identifies the completion of the PDP context activation sequence. MD 1 102 can now send the voice message packets 818 to MD 3 106.

Figure 9:
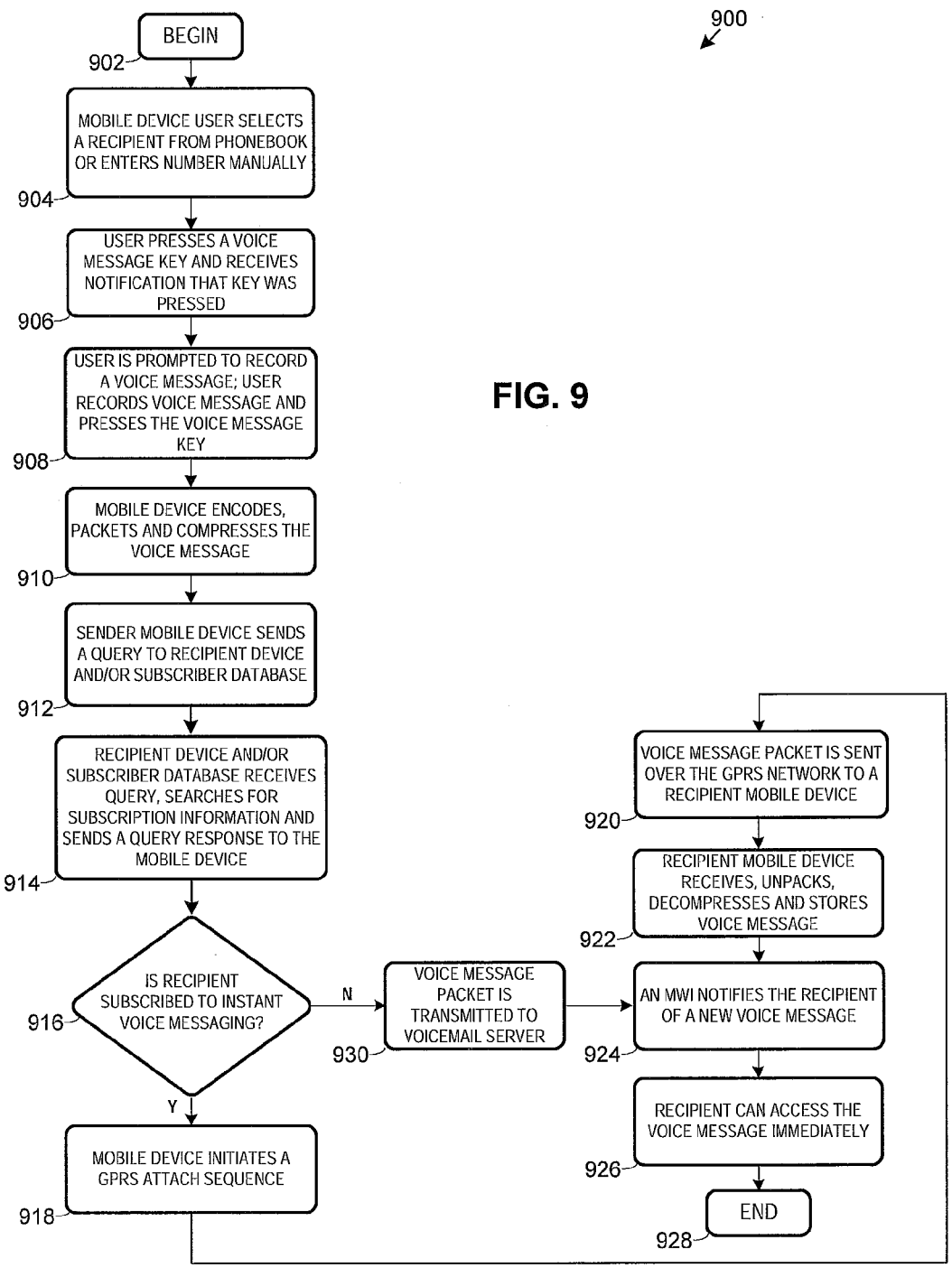
FIG. 9 is a flow chart of an exemplary method for directly sending a voice message from a sender MD to a recipient MD over a GPRS network, according to the present invention.

Referring now to FIG. 9, a flow chart of an exemplary method 900 for directly sending a voice message from a sender MD to a recipient MD over a GPRS network is shown. To aid in teaching the exemplary method 900, MD 1 102 is designated as the sender MD and MD 3 106 is designated as the recipient MD. The exemplary method 900 is now described with reference to FIG. 6 and FIGS. 2a-2j.

The exemplary method 900 begins at step 902 and proceeds to step 904 where a MD user can identify an instant voice message recipient. The user can either manually enter a telephone number (as shown in FIG. 2a), or select a recipient from a contact list, an address book, a phonebook, and the like (as shown in FIG. 2b). After the user identifies an instant voice message recipient, the exemplary method proceeds to step 906, where the user presses a voice message key 206. Upon pressing the voice message key 206, the user can be presented with a screen, for example, as shown in FIG. 2d. It is contemplated that the user need only highlight the recipient; for example, Contact A in FIG. 2b, then press the voice message key 206. Alternatively, as shown in FIG. 2b, the user can select a contact; for example, by pressing the hard button 208 associated with the Select soft key (as shown in FIG. 2c) and be presented with a menu of contact options for that user. If the voice message key 206 is utilized, the user can receive a notification that the voice message key 206 was pressed. The notification can comprise an icon, a message, and/or an audible tone. Moreover, the notification can be set to a default icon, message, and/or audible tone that may later be changed to accommodate a user's preferences.

After the notification, the method proceeds to step 908, where the user is given recording options, as best shown in FIG. 2d and FIG. 2e. The user can select the start recording option and begin dictating a voice message. After the user is finished recording a voice message, the user can select the stop recording option. The user may then be provided with an options menu comprising options to send, listen, and re-record the voice message (as shown in FIG. 3f). Alternatively, the options available in FIG. 2f can be incorporated into the recording options in FIGS. 2d and 2a. After the user is satisfied with the recorded voice message, the user can either select the send menu option by pressing the hard key 208 associated with the Select soft key, or the user can press the voice message key 206 to initiate a send sequence. The exemplary method then proceeds to step 910.

In step 910, the voice message is encoded and divided into packets. The voice message packets are then compressed in preparation to be sent to a recipient MD (e.g., MD 3 106). It is contemplated that encoding the voice message, dividing the encoded voice message into packets, and compressing the voice message packets can be accomplished by any method or combination of methods known to those skilled in the art. The exemplary method then proceeds to step 912.

In step 912, the MD 1 106 sends a query to MD 3 106 and/or a database (e.g., subscriber database 128 or HLR 132), and awaits a response. The query can comprise a request, for example, for subscription information. This subscription information can be stored, for example, in a Subscriber Identity Module (SIM) in a GSM network, in a Universal Subscriber Identity Module (USIM) in a UMTS network, in a similar module in a CDMA-based network, and/or stored on a device readable memory of the MD (e.g., internal memory 414 and/or external/removable memory 416 as shown in FIG. 4).

In a CDMA-based network, such as CDMA2000, the recipient MD's Electronic Serial Number (ESN) can be used to access the MD information stored in a corresponding field of the subscriber database 128. It should be understood that the subscriber database 128 is described as the searched database; however, an HLR (e.g., HLR 132) may also be used. For example, the query can request the ESN of the recipient MD and send the ESN to the subscriber database 128 for comparison.

In step 914, the subscriber database 128 can search for information stored in a subscription database field corresponding to the ESN and/or subscription information found in the memory and/or other device (e.g., a SIM or USIM) of MD 3 106. Alternatively and regardless of the technology used, the query can be sent directly to the subscriber database 128 and use, for example, the recipient's telephone number to search the subscriber database 128 and obtain the MD information without first querying MD 3 106. The latter method may also be used if MD 3 106 is not available, for example, it is powered off.

After the subscription information is obtained from MD 3 106 and/or the subscriber database 128, a query response is sent to MD 1 102. The query response is used to indicate whether the user of MD 3 106 is subscribed to instant voice messaging service. The query response can comprise, for example, a digit string, a character string, a string of bits, or the like, to identify MD 3 106 as being subscribed or not subscribed to an instant voice messaging service. As with other wireless services such as text messaging and multimedia text messaging, it is contemplated that a user can be given the options to either pay-per-use, subscribe to an instant voice messaging service plan, or opt-out of the service. This and other pertinent information may be exchanged in the query and query response. It should be understood that this information can determine the way the instance voice message is routed. For example, if a recipient MD is compatible with instant voice messaging service, but the user has elected to opt-out of the service, then the instant voice message would be sent directly to the voicemail server 130. After the query response is received at MD 1 102, the method proceeds to step 916, where the query response is deciphered.

If MD 3 106 is subscribed to instant voice messaging the method proceeds to step 918, where MD 1 102 initiates a GPRS attach sequence (as shown in FIG. 7) and a PDP context activation sequence (as shown in FIG. 8). It should be understood that the GPRS attach sequence and PDP context activation sequence can occur at any time prior to sending the voice message packets. Moreover, the GPRS attach sequence can be triggered when MD 1 102 is powered on and can remain attached for the duration of the power on session. Alternatively, the GPRS attach sequence can be triggered when a user chooses to send an instant voice message.

In the embodiments described with reference to FIG. 1 and FIG. 3, the voice message packets are transmitted over a wireless network 100, which in this embodiment is a GPRS network. Due to the nature of GPRS, the recipient MD may not always be attached and as such measures must be taken to insure that the recipient MD is attached and capable of receiving voice message packets from another MD. To insure that the recipient MD is attached a signal or message can be sent to the recipient MD to notify it of the pending voice message.

For example, a signal can be sent on a channel radiating from the BTS to instruct the recipient MD to initiate a GPRS attach sequence.

In step 920, the voice message packets are transmitted via the GPRS network to MD 3 106. In step 922, MD 3 106 receives the voice message packet. Upon receipt, the voice message packets are decompressed, unpacked, decoded, and stored in a device readable memory, for example, internal memory 414 or external/removable memory 416. The method by which the voice message packets are decompressed, unpacked, and decoded can be any method(s) known to those skilled in the art.

In step 924, an IVMWI 218 can be displayed to inform the recipient of a new voice message. After the IVMWI 218 is displayed, the method 900 proceeds to step 924, where the recipient can access the voice message. The recipient can access the instant voice message by pressing the voice message key 206 on the recipient MD, or alternatively, a different key can be used to access the voice message. It is contemplated that the recipient can define which key is used for instant voice messaging functions. The instant voice message can also be accessed via a menu as is typically done for accessing text and multimedia messages. Alternatively, the instant voice message can be forwarded to the voicemail server 130, for example, if MD 3 106 is powered off. Upon re-registration (i.e., powering up) the voicemail server 130 can be triggered to send the stored instant voice message to MD 3 106, where the instant voice message can be stored. The method then proceeds to step 926, where the recipient can access the voice message. The method ends in step 928.

In step 916, if the recipient is not subscribed to instant voice messaging service, the method proceeds to step 930, where the voice message packets are transmitted directly to the voicemail server 130. The voicemail server 130 receives the voice message packet. Upon receipt, the voice message packets are decompressed, unpacked, decoded, and stored in a device readable memory of the voicemail server 130. Instant voice messages and traditional voice messages stored in the voicemail server 130 can both be accessed by the recipient via a current method (e.g., calling the voicemail server 130 and accessing a subscriber-specific voicemail box). It should be understood that although both the instant voice message and the traditional voice message are stored on the voicemail server 130, the method by which the different types of voice message are transmitted are different.

In step 924, a VMWI 214 is displayed to inform the recipient of a new voice message. After the VMWI 214 is displayed, the method 900 proceeds to step 926, where the recipient can access the voice message. The recipient can access the instant voice message by pressing the voice message key 206 on the recipient MD, or alternatively, a different key can be used to access the voice message. The recipient can define which key is used for instant voice messaging functions. The instant voice message can also be accessed via a menu as is typically done for accessing text and multimedia messages. Alternatively, the instant voice message can be forwarded to the voicemail server 130, for example, if MD 3 106 is powered off. Upon re-registration (i.e., power on) the voicemail server 130 can be triggered to send the stored instant voice message to MD 3 106. The method then proceeds to step 926, where the recipient can access the voice message. The method ends in step 928.

It is contemplated that the sender MD can receive notification that the recipient MD is not subscribed to instant voice messaging service and that the voice message will be stored in a voicemail server. The notification can occur before the message is sent and after receipt of a query response. For example, the notification informs the sender that the voice message will not be sent to the recipient's MD, instead the voice message will be sent to a voicemail server where the recipient can retrieve the voice message. The sender can also be provided an option to cancel transmission of the voice message.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for transmitting an instant voice message, the method comprising:
    receiving, at a sender mobile device, an identification of a recipient mobile device to which the instant voice message is to be sent;
    receiving, via a microphone of the sender mobile device, an audio input signal and storing at least temporarily the audio input signal as the instant voice message in a memory of the sender mobile device;
    the sender mobile device querying one of a subscriber database and the recipient mobile device to determine whether the recipient mobile device is capable of receiving instant voice messages;
    the sender mobile device receiving a query response from one of the subscriber database and the recipient mobile device, the query response indicating whether the recipient mobile device is capable of receiving the instant voice messages;
    if the query response indicates that the recipient mobile device is capable of receiving the instant voice messages, the sender mobile device sending the instant voice message to the recipient mobile device; and
    if the query response indicates that the recipient mobile device is not capable of receiving the instant voice messages, the sender mobile device sending the instant voice message to a voicemail server for storage in association with a voicemail account of the recipient mobile device, so that the recipient mobile device can retrieve the instant voice message from the voicemail server;
    wherein the sender mobile device querying one of the subscriber database and the recipient mobile device to determine whether the recipient mobile device is capable of receiving the instant voice messages comprises the sender mobile device querying one of the subscriber database and the recipient mobile device to determine whether the recipient mobile device is opted out of an instant voice message service.

2. The method of claim 1, wherein receiving, at the sender mobile device, the identification of the recipient mobile device comprises one of:
    receiving, at the sender mobile device, a telephone number via an input interface of the sender mobile device; and
    receiving a selection of a recipient from a contact list via the input interface.

3. A sender mobile device configured to transmit an instant voice message, the sender mobile device comprising:
    a transceiver;
    a user interface configured to receive an identification of a recipient mobile device to which the instant voice message is to be sent;

a microphone configured to receive an audio input signal;

a memory configured to store at least temporarily the audio input signal as the instant voice message and to store processor-executable instructions;

a processor configured to execute the instructions stored in the memory to cause the transceiver to:

transmit a query directed to one of a subscriber database and the recipient mobile device to determine whether the recipient mobile device is capable of receiving instant voice messages;

receive a query response from one of the subscriber database and the recipient mobile device, wherein the query response indicates whether the recipient mobile device is capable of receiving the instant voice messages;

if the query response indicates that the recipient mobile device is capable of receiving the instant voice messages, transmit the instant voice message to the recipient mobile device; and if the query response indicates that the recipient mobile device is not capable of receiving the instant voice messages, transmit the instant voice message to a voicemail server for storage in association with a voicemail account of the recipient mobile device, so that the recipient mobile device can retrieve the instant voice message from the voicemail server;

wherein the query is to determine whether the recipient mobile device is opted out of an instant voice message service.

4. The sender mobile device of claim 3, wherein the user interface configured to receive the identification of the recipient mobile device to which the instant voice message is to be sent comprises the user interface being configured to receive the identification as one of a telephone number input and a selection of a recipient from a contact list.

5. A non-transitory computer-readable medium encoded with computer-executable instructions that, when executed by a processor, cause the processor to perform a method comprising:

receiving an identification of a recipient mobile device to which an instant voice message is to be sent;

receiving, via a microphone, an audio input signal and storing at least temporarily the audio input signal as the instant voice message in the non-transitory computer-readable medium;

querying one of a subscriber database and the recipient mobile device to determine whether the recipient mobile device is capable of receiving instant voice messages;

receiving a query response from one of the subscriber database and the recipient mobile device, the query response indicating whether the recipient mobile device is capable of receiving the instant voice messages;

if the query response indicates that the recipient mobile device is capable of receiving the instant voice messages, sending the instant voice message to the recipient mobile device; and if the query response indicates that the recipient mobile device is not capable of receiving the instant voice messages, sending the voice message to a voicemail server for storage in association with a voicemail account of the recipient mobile device, so that the recipient mobile device can retrieve the instant voice message from the voicemail server;

wherein querying one of the subscriber database and the recipient mobile device to determine whether the recipient mobile device is capable of receiving the instant voice messages comprises querying one of the subscriber database and the recipient mobile device to determine whether the recipient mobile device is opted out of an instant voice message service.

6. The non-transitory computer-readable medium of claim 5, wherein receiving the identification of the recipient mobile device comprises one of receiving a telephone number received via an input interface and a selection of a recipient from a contact list received via the input interface.

\* \* \* \* \*